US 10,005,464 B2

(12) United States Patent
Toyoda et al.

(10) Patent No.: US 10,005,464 B2
(45) Date of Patent: Jun. 26, 2018

(54) AUTONOMOUS VEHICLE OPERATION AT MULTI-STOP INTERSECTIONS

(71) Applicant: Toyota Motor Engineering & Manufacturing North America, Inc., Erlanger, KY (US)

(72) Inventors: Heishiro Toyoda, Ann Arbor, MI (US); Joshua Domeyer, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 177 days.

(21) Appl. No.: 14/837,351

(22) Filed: Aug. 27, 2015

(65) Prior Publication Data

US 2017/0057514 A1    Mar. 2, 2017

(51) Int. Cl.

| | |
|---|---|
| *B60W 30/18* | (2012.01) |
| *B60W 10/04* | (2006.01) |
| *B60W 10/18* | (2012.01) |
| *B60W 10/20* | (2006.01) |
| *B60W 30/08* | (2012.01) |
| *G05D 1/00* | (2006.01) |
| *B60W 10/184* | (2012.01) |
| *B60W 40/04* | (2006.01) |

(Continued)

(52) U.S. Cl.
CPC ...... *B60W 30/18154* (2013.01); *B60W 10/04* (2013.01); *B60W 10/184* (2013.01); *B60W 10/20* (2013.01); *B60W 40/04* (2013.01); *G08G 1/0112* (2013.01); *G08G 1/161* (2013.01); *B60W 2720/103* (2013.01)

(58) Field of Classification Search
CPC ........... B60W 30/18154; B60W 10/20; B60W 10/04; B60W 40/04; B60W 10/184; B60W 2720/103; G08G 1/0112; G08G 1/161
See application file for complete search history.

(56) References Cited

U.S. PATENT DOCUMENTS

| | | | |
|---|---|---|---|
| 7,979,172 B2 * | 7/2011 | Breed | ............... G08G 1/161 701/117 |
| 8,712,624 B1 | 4/2014 | Ferguson et al. | |

(Continued)

OTHER PUBLICATIONS

U.S. Appl. No. 14/581,757, filed Dec. 23, 2014.

*Primary Examiner* — Mussa A Shaawat
(74) *Attorney, Agent, or Firm* — Christopher G. Darrow; Darrow Mustafa PC

(57) ABSTRACT

An autonomous vehicle can operate with respect to other vehicles at a multi-stop intersection. One or more other objects (e.g., vehicles) approaching the multi-stop intersection from a different direction than the autonomous vehicle can be detected. An arrival time of the autonomous vehicle and the detected one or more other objects at the multi-stop intersection can be determined. In response to determining that the arrival time of the autonomous vehicle and the detected one or more other objects at the multi-stop intersection is substantially the same, a driving maneuver for the autonomous vehicle can be determined. As an example, the driving maneuver can include stopping short of an originally intended stopping point and/or decelerating so that the arrival time of the autonomous vehicle is not substantially the same as the other objects at the multi-stop intersection. The autonomous vehicle can be caused to implement the determined driving maneuver.

17 Claims, 5 Drawing Sheets

(51) Int. Cl.
*G08G 1/01* (2006.01)
*G08G 1/16* (2006.01)

(56) References Cited

U.S. PATENT DOCUMENTS

| | | | | |
|---|---|---|---|---|
| 8,761,991 | B1* | 6/2014 | Ferguson | G05D 1/0088 340/917 |
| 9,633,560 | B1* | 4/2017 | Gao | G08G 1/0145 |
| 2008/0162027 | A1* | 7/2008 | Murphy | B60W 50/14 701/117 |
| 2011/0182475 | A1* | 7/2011 | Fairfield | G06K 9/00825 382/104 |
| 2013/0304279 | A1* | 11/2013 | Mudalige | G08G 1/164 701/2 |
| 2015/0110344 | A1* | 4/2015 | Okumura | G06K 9/00798 382/103 |
| 2015/0185034 | A1* | 7/2015 | Abhyanker | G01C 21/36 701/23 |
| 2016/0161270 | A1* | 6/2016 | Okumura | G01C 21/34 701/23 |
| 2016/0179093 | A1* | 6/2016 | Prokhorov | G08G 1/167 701/2 |
| 2016/0231746 | A1* | 8/2016 | Hazelton | G05D 1/0212 |
| 2016/0288788 | A1* | 10/2016 | Nagasaka | B62D 15/025 |

* cited by examiner

AUTONOMOUS VEHICLE OPERATION AT MULTI-STOP INTERSECTIONS

FIELD

The subject matter described herein relates in general to vehicles having an autonomous operational mode and, more particularly, to the operation of such vehicles with respect to multi-stop intersections.

BACKGROUND

Some vehicles include an operational mode in which a computing system is used to navigate and/or maneuver the vehicle along a travel route with minimal or no input from a human driver. Such vehicles include sensors that are configured to detect information about the surrounding environment, including the presence of objects in the environment. The computing systems are configured to process the detected information to determine how to navigate and/or maneuver the vehicle through the surrounding environment.

SUMMARY

In one respect, the present disclosure is directed to a method of operating an autonomous vehicle with respect to other vehicles at a multi-stop intersection. The method can include detecting one or more other objects approaching the multi-stop intersection. The one or more other objects can be approaching the multi-stop intersection from a different direction than the autonomous vehicle. The method can include determining an arrival time of the autonomous vehicle and an arrival time of the detected one or more other objects at the multi-stop intersection. The method can include, responsive to determining that the arrival time of the autonomous vehicle and the arrival time of the detected one or more other objects at the multi-stop intersection is substantially the same, determining a driving maneuver for the autonomous vehicle. The method can include causing the autonomous vehicle to implement the determined driving maneuver.

In another respect, the present disclosure is directed to a system for an autonomous vehicle encountering a multi-stop intersection. The system can include a sensor system. The sensor system can be configured to detect one or more other objects approaching the multi-stop intersection. The one or more other objects can be approaching the multi-stop intersection from a different direction than the autonomous vehicle. The system can include a processor operatively connected to the sensor system. The processor can be programmed to initiate executable operations. The executable operations can include determining an arrival time of the autonomous vehicle and an arrival time of the detected one or more other objects at the multi-stop intersection. The executable operations can include, responsive to determining that the arrival time of the autonomous vehicle and the arrival time of the detected one or more other objects at the multi-stop intersection is substantially the same, determining a driving maneuver for the autonomous vehicle. The executable operations can include causing the autonomous vehicle to implement the determined driving maneuver.

In yet another respect, the present disclosure is directed to a computer program product for operating an autonomous vehicle with respect to other vehicles at a multi-stop intersection. The computer program product includes a computer readable storage medium having program code embodied therein. The program code executable by a processor to perform a method. The method can include determining an arrival time of the autonomous vehicle and an arrival time of a detected one or more other objects at the multi-stop intersection. The detected one or more other objects can be approaching the multi-stop intersection from a different direction than the autonomous vehicle. The method can include, responsive to determining that the arrival time of the autonomous vehicle and the arrival time of the detected one or more other objects at the multi-stop intersection is substantially the same, determining a driving maneuver for the autonomous vehicle. The method can include causing the autonomous vehicle to implement the determined driving maneuver.

DETAILED DESCRIPTION

Figure 1:
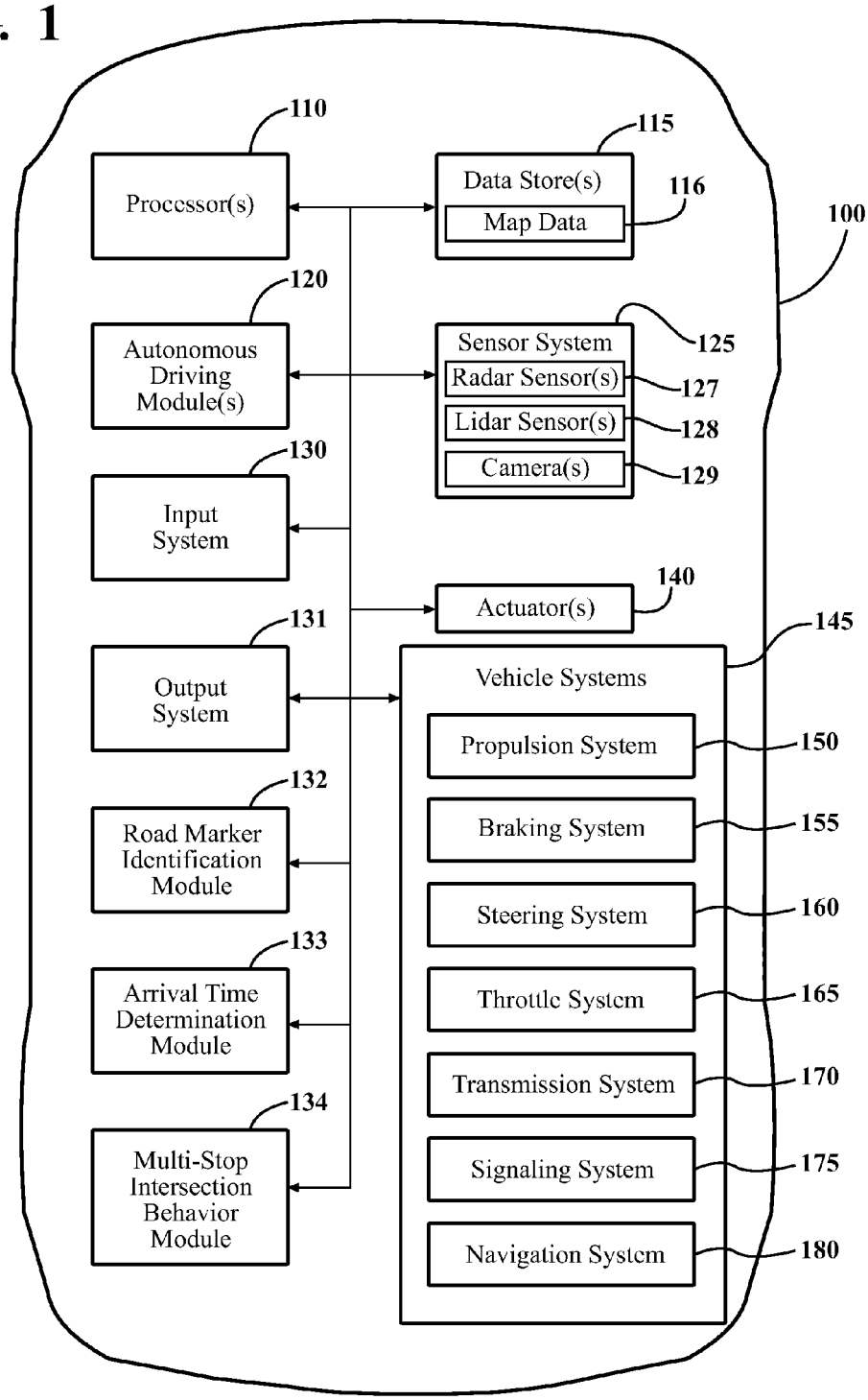
FIG. 1 is an example of an autonomous vehicle.

This detailed description relates to the operation of an autonomous vehicle with respect to a multi-stop intersection. A "multi-stop intersection" includes any common area through which vehicles pass and from which vehicles can approach from a plurality of directions. The vehicles are supposed to stop prior to proceeding through the intersection, as indicated by a traffic control device (e.g., a stop sign, a flashing red light, pavement markers, a stop line, a person directing traffic, etc.). Non-limiting examples of multi-stop intersections include all way stops, two-way stops, three-way stops, and/or four-way stops, just to name a few possibilities.

According to arrangements described herein, an arrival time of an autonomous vehicle at the multi-stop intersection can be determined. One or more other objects (e.g., vehicles) can approach the multi-stop intersection from a different direction than the autonomous vehicle. Such objects can be detected, and an arrival time of the detected one or more other objects at the multi-stop intersection can be determined. The arrival time of the autonomous vehicle and/or the arrival time of the detected one or more other objects can be actual or predicted. In response to determining that the arrival time of the autonomous vehicle and the arrival time of the detected one or more other objects at the multi-stop intersection is substantially the same, a driving maneuver for the autonomous vehicle can be determined. The present detailed description relates to systems, methods and computer program products that incorporate such features. In at least some instances, such systems, methods and computer program products can improve the performance of the autonomous vehicle and/or the safe operation of the autonomous vehicle.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In one or more implementations, the vehicle 100 may be a watercraft, an aircraft or any other form of motorized transport.

According to arrangements herein, the vehicle 100 can be an autonomous vehicle. As used herein, "autonomous vehicle" means a vehicle that configured to operate in an autonomous mode. "Autonomous mode" means that one or more computing systems are used to navigate and/or maneuver the vehicle along a travel route with minimal or no input from a human driver. In one or more arrangements, the vehicle 100 can be highly automated. In some instances, the vehicle 100 can be configured to be selectively switched between an autonomous mode and a manual mode. Such switching can be implemented in any suitable manner, now known or later developed. "Manual mode" means that a majority of the navigation and/or maneuvering of the vehicle along a travel route is performed by a human driver.

The vehicle 100 can include various elements, some of which may be a part of an autonomous driving system. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 can include one or more processors 110. "Processor" means any component or group of components that are configured to execute any of the processes described herein or any form of instructions to carry out such processes or cause such processes to be performed. The processor 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor 110 can be a main processor of the vehicle 100. For instance, the processor 110 can be an engine control unit (ECU).

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor 110, or the data store 115 can be operatively connected to the processor 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. The map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360 degree ground views. The map data 116 can be highly detailed. In some instances, the map data 116 can be located onboard the vehicle 100. Alternatively, at least a portion of the map data 116 can be located in a data store or source that is remote from the vehicle 100. The map data 116 can include terrain data. The terrain data can include information about the terrain of one or more geographic areas. The terrain data can include elevation data in the one or more geographic areas. In some instances, the terrain data can be located onboard the vehicle 100. The map data 116 can include a digital map with information about road geometry.

The vehicle 100 can include various modules, at least some of which will be described herein. The modules can be implemented as computer readable program code that, when executed by a processor, implement one or more of the various processes described herein. One or more of the modules can be a component of the processor 110, or one or more of the modules can be executed on and/or distributed among other processing systems to which the processor 110 is operatively connected.

The vehicle 100 can include an autonomous driving module 120. The autonomous driving module 120 can include instructions (e.g., program logic) executable by the processor 110. Such instructions can include instructions to execute various vehicle functions and/or to transmit data to, receive data from, interact with, and/or control the vehicle 100 or one or more systems thereof (e.g. one or more of vehicle systems 145). Alternatively or in addition, the data store 115 may contain such instructions. The autonomous driving module 120 can be configured to determining path(s), current driving maneuvers for the vehicle 100, future driving maneuvers and/or modifications to current driving maneuvers. The autonomous driving module 120 can also cause, directly or indirectly, such path(s), driving maneuvers, and/or modifications thereto to be implemented.

The vehicle 100 can include a sensor system 125. The sensor system 125 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 125 includes a plurality of sensors, the sensors can work independently from each other. Alternatively, two or more of the sensors can work in combination with each other. In such case, the two or more sensors can form a sensor network. The sensor system 125 and/or the one or more sensors can be operatively connected to the processor 110, the data store 115, the autonomous driving module 120 and/or other element of the vehicle 100.

The sensor system 125 can include any suitable type of sensor. For example, the sensor system 125 can include one or more sensors configured to detect, determine, assess, monitor, measure, quantify and/or sense information about the vehicle 100. Alternatively or in addition, the sensor system 125 can include one or more sensors configured to detect, determine, assess, monitor, measure, quantify and/or sense information about the external environment in which the vehicle 100 is located, including information about objects in the external environment. Such objects may be stationary objects and/or dynamic objects. Alternatively or in addition to one or more of the above examples, the sensor system 125 can include one or more sensors configured to detect, determine, assess, monitor, measure, quantify and/or sense the location of the vehicle 100 and/or the location of objects in the environment relative to the vehicle 100. Various examples of these and other types of sensors will be described herein. It will be understood that the embodiments are not limited to the particular sensors described.

The sensor system 125 can include one or more sensors configured to detect, determine, assess, monitor, measure, quantify and/or sense position and orientation changes of the vehicle 100, such as, for example, based on inertial acceleration. In one or more arrangements, the sensor system 125 can include accelerometers, gyroscopes and/or other suitable sensors. The sensor system 125 can include sensors that can monitor one or more internal systems of the vehicle 100 (e.g., an $O_2$ monitor, a fuel gauge, an engine oil temperature, coolant temperature, etc.). In one or more arrangements, the sensor system 125 can include a speedometer (not shown). The speedometer can determine a current speed of the vehicle 100, or data acquired by the speedometer can be used to determine a current speed of the vehicle 100.

The sensor system 125 can include one or more sensors configured to sense the external environment of the vehicle 100 or portions thereof. For instance, the sensor system 125 can be configured to acquire data of at least a portion of an external environment of the vehicle 100. For instance, the sensor system 125 can be configured to acquire data of at least a forward portion of an external environment of the vehicle 100. "Forward portion" means a portion of the external environment that is located in front of the vehicle in the travel direction of the vehicle. The forward portion can include portion of the external environment that are offset from the vehicle in the right and/or left lateral directions. Such environment sensors can be configured to detect, determine, assess, monitor, measure, quantify and/or sense objects in at least a portion of the external environment of the vehicle 100 and/or information/data about such objects. Various examples of such sensors will be described herein. However, it will be understood that the embodiments are not limited to the particular sensors described.

In one or more arrangements, the sensor system 125 can include one or more radar sensors 127. "Radar sensor" means any device, component and/or system that can detect, determine, assess, monitor, measure, quantify and/or sense something using at least in part radio signals. The one or more radar sensors 127 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions, the elevation of each detected object, the speed of each detected object and/or the movement of each detected object. The one or more radar sensors 127, or data obtained thereby, can determine or be used to determine the speed of objects in the external environment of the vehicle 100. The one or more radar sensors 127 can have three dimensional coordinate data associated with it the objects.

In one or more arrangements, the sensor system 125 can include one or more lidar sensors 128. "Lidar sensor" means any device, component and/or system that can detect, determine, assess, monitor, measure, quantify and/or sense something using at least in part lasers. The lidar sensor can include a laser source and/or laser scanner configured to emit a laser signal and a detector configured to detect reflections of the laser signal. The lidar sensor may be configured to operate in a coherent or an incoherent detection mode. The one or more lidar sensors 128 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions, the elevation of each detected object, the speed of each detected object, and/or the movement of each detected object.

Alternatively or in addition to any of the sensors described above, the sensor system 125 can include other types of sensors. As an example, the sensor system 125 can include one or more sonar sensors (not shown). The sensor system 125, the processor 110, and/or one or more other elements of the vehicle 100 can be configured to detect forward vehicles relative position and velocity in the same travel lane as the present vehicle or in neighboring travel lanes.

The sensor system 125 can include one or more cameras 129. "Camera" is defined as any device, component, and/or system that can capture visual data. "Visual data" includes video and/or image information/data. The visual data can be in any suitable form. The one or more cameras 129 can be high resolution cameras. The high resolution can refer to the pixel resolution, the spatial resolution, spectral resolution, temporal resolution and/or radiometric resolution. In one or more arrangements, the one or more cameras 129 can be high dynamic range (HDR) cameras or infrared (IR) cameras.

In one or more arrangements, one or more of the cameras 129 can include a lens (not shown) and an image capture element (not shown). The image capture element can be any suitable type of image capturing device or system, including, for example, an area array sensor, a Charge Coupled Device (CCD) sensor, a Complementary Metal Oxide Semiconductor (CMOS) sensor, a linear array sensor, a CCD (monochrome). The image capture element may capture images in any suitable wavelength on the electromagnetic spectrum. The image capture element may capture color images and/or grayscale images. The one or more of the cameras 129 can be configured with zoom in and/or zoom out capabilities.

In one or more arrangements, one or more of the cameras 129 can be oriented, positioned, configured, operable, and/or arranged to capture visual data from at least a portion of the external environment of the vehicle 100. In one or more arrangements, one or more cameras 129 can be oriented, positioned, configured, operable, and/or arranged to capture visual data from at least a forward portion of the external environment of the vehicle 100. As a further example, at least one camera 129 can be oriented, positioned, configured, operable, and/or arranged to acquire visual data from at least a left forward portion of the external environment of the vehicle 100, and at least one camera 129 can be oriented, positioned, configured, operable, and/or arranged to acquire visual data from at least a right forward portion of the external environment of the vehicle 100.

The one or more cameras 129 can be located in any suitable portion of the vehicle 100. For instance, one or more of the cameras 129 can be located within the vehicle 100. One or more of the cameras 129 can be located on the exterior of the vehicle 100. One or more of the cameras 129 can be located on or exposed to the exterior of the vehicle 100. As an example, the one or more cameras 129 can be located in a central region at or near the front end 101 of the vehicle 100. As another example, one or more cameras 129 can be located on the roof of the vehicle 100.

The position of one or more of the cameras 129 can be fixed such that its position does not change relative to the vehicle 100. One or more of the cameras 129 can be movable so that its position can change to allow visual data from different portions of the external environment of the vehicle 100 to be captured. The movement of the cameras 129 can be achieved in any suitable manner. For instance, the cameras 129 can be rotatable about one or more axes, pivotable, slidable, and/or extendable, just to name a few possibilities. In one or more arrangements, the camera(s) 129 can have any suitable range of motion, including, for example, substantially spherical, substantially hemi-spherical, substantially circular and/or substantially linear. As used herein, the term "substantially" includes exactly the term it modifies and slight variations therefrom. Thus, for example, the term "substantially spherical" means exactly spherical and slight variations therefrom. The one or more cameras 129 and/or the movement of the one or more cameras 129 can be controlled by a camera system, the sensor system 125, the processor 110 and/or any one or more of the modules described herein or other module.

The sensor system 125, the processor 110, and/or one or more other elements of the vehicle 100 can be operable to control movements of one or more of the sensors of the sensor system 125. It should be noted that any of the sensors described herein can be provided in any suitable location with respect to the vehicle 100. For instance, one or more sensors can be located within the vehicle 100, one or more sensors can be located on the exterior of the vehicle and/or one or more sensors can be located so as to be exposed to the exterior of the vehicle 100.

The vehicle 100 can include an input system 130. An "input system" is defined as any device, component, system, element or arrangement or groups thereof that enable information/data to be entered into a machine. The input system 130 can receive an input from a vehicle occupant (e.g. a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 131. An "output system" is defined as any device, component, system, element or arrangement or groups thereof that enable information/data to be presented to a vehicle occupant (e.g. a person, a vehicle occupant, etc.). The output system 131 can present information/data to a vehicle occupant. The output system 131 can include a display, as described above. Alternatively or in addition, the output system 131 may include a microphone, earphone and/or speaker. Some components of the vehicle 100 may serve as both a component of the input system 130 and a component of the output system 131.

In one or more arrangements, the vehicle 100 can include a road marker identification module 132. The road marker identification module 132 can include instructions (e.g., program logic) executable by the processor 110. Alternatively or in addition, the data store 115 may contain such instructions. In some arrangements, the road marker identification module 132 can be configured to detect, determine, assess, measure, analyze, recognize, and/or to identify travel lane markers and/or other road markers (e.g., stop indicator) from data acquired by the sensor system 125 (e.g., visual data obtained by the one or more cameras 129 and/or other data). The road marker identification module 132 can identify road marker(s) using a machine vision system and/or using any suitable technique (e.g., image processing), now known or later developed. A "travel lane marker" is any indicia on a road that designates at least a portion of the road for use by a single line of vehicles. A "stop indicator" is any indicia on a road that is designed to indicate a stopping point for a vehicle relative to an intersection, cross-walk, or other area. As an example, the stop indicator can be a stop line (see, e.g., stop line 340 in FIGS. 3A-3B).

The road marker identification module 132 can also include any suitable object recognition software. The object recognition software can analyze an image captured by one or more cameras 129. In some instances, the object recognition software can query an object image database for possible matches. For instance, images captured by one or more cameras 129 can be compared to images in the object image database for possible matches. Alternatively or in addition, measurements or other aspects of visual data captured by one or more cameras 129 can be compared to measurements or other aspects of any images in the object image database. In some instances, the road marker identification module 132 can identify a travel lane marker if there is a match between the captured image and an image in the object database. "Match" or "matches" means that visual data acquired by one or more cameras 129 and one or more of the images in the object image database are substantially identical. For instance, the visual data acquired by one or more cameras 129 and one or more of the images in the object image database can match within a predetermined probability (e.g., at least about 85%, at least about 90%, at least about 95% or greater) or confidence level.

In one or more arrangements, the vehicle 100 can include an arrival time determination module 133. The arrival time determination module 133 can include instructions (e.g., program logic) executable by the processor 110. Alternatively or in addition, the data store 115 may contain such instructions. In one or more arrangements, the arrival time determination module 133 can be configured to determine the arrival time of the vehicle 100 at a multi-stop intersection. Alternatively or in addition, the arrival time determination module 133 can be configured to determine the arrival time of one or more other objects at a multi-stop intersection. It should be noted that for each travel lane that approaches the multi-stop intersection, there may be a plurality of objects located in one or more of the travel lanes. For instance, a plurality of vehicles can be approaching an intersection in the same travel lane. In one or more arrangements, the arrival time determination module 133 can determine the arrival time for the lead object in each travel lane. "Lead object" means the object that is located closest to the intersection. Thus, for example, for a plurality of vehicles, the arrival time determination module 133 can determine the arrival time for the lead vehicle (i.e., the vehicle in the travel lane that is located closest to the intersection).

The determination of the arrival time at the multi-stop intersection can be performed in any suitable manner. In one or more arrangements, the arrival time of the autonomous vehicle and/or the detected one or more other objects at the multi-stop intersection can be based on the actual arrival time of the autonomous vehicle and/or the detected one or more other objects at the multi-stop intersection. For example, the vehicle 100 can determine the time at which the vehicle 100 comes to substantially a complete stop. A "substantially complete stop" includes instances in which the speed of the vehicle is zero or near zero (e.g., about 1 mile per hour or less) and/or in which no change in position or no substantial change in position of the vehicle occurs. Such a determination can be based on data acquired by one or more sensors of the sensor system 125. Such a determination can include assessing, measuring, quantifying and/or sensing, directly or indirectly, the speed, acceleration, deceleration, and/or other aspect of the vehicle 100 and/or the detected one or more other objects.

In one or more arrangements, the arrival time of the autonomous vehicle and/or the arrival time of the detected one or more other objects at the multi-stop intersection can be predicted. Such a prediction can be performed in any suitable manner. The prediction can be based on one or more factors. For instance, with respect to the vehicle 100, the prediction can be at least partially based on one or more of the following factors: a current speed of the vehicle 100, a current rate of deceleration of the vehicle 100, a current rate of change of the speed of the vehicle 100, and/or the distance between the vehicle 100 and a designated stopping point or other reference point relative to the intersection. The designated stopping point can be defined in any suitable manner. For instance, the designated stopping point can be at or near a stop indicator (e.g., a stop line, a stop sign, a pedestrian cross-walk, etc.). With respect to the detected one or more other objects, the prediction can be at least partially based on one or more of the following factors: a current speed of the object(s), a current rate of deceleration of the object(s), a current rate of change of the speed of the object(s), and/or the distance between the object(s) and a designated stopping point or other reference point relative to the intersection.

In one or more arrangements, the arrival time determination module 133 can be configured to compare the arrival times of the vehicle 100 and/or the detected one or more other objects. The arrival time determination module 133 can determine whether the arrival times are substantially the same. "Substantially the same" means that the arrival times are identical or within a predetermined amount of time of each other. In one or more arrangements, the arrival times can be compared to an absolute time scale or a reference point in time. Alternatively or in addition, the arrival times can be compared relative to each other.

In one or more arrangements, the vehicle 100 can include a multi-stop intersection behavior module 134. The multi-stop intersection behavior module 134 can include instructions (e.g., program logic) executable by the processor 110. Alternatively or in addition, the data store 115 may contain such instructions. In some arrangements, the multi-stop intersection behavior module 134 can be configured to determine a driving maneuver for the autonomous vehicle. The multi-stop intersection behavior module 134 can be configured to make such a determination in response to determining that the arrival time of the autonomous vehicle and the arrival time of the detected one or more other objects at the multi-stop intersection is substantially the same. Any suitable driving maneuver can be determined.

In some instances, the determination of a suitable driving maneuver can be based on the manner in which the arrival times are determined. For instance, when determining that the arrival time of the autonomous vehicle and the detected one or more other objects at the multi-stop intersection is substantially the same is based on actual arrival times, the driving maneuver can include remaining stopped at the multi-stop intersection for a predetermined period of time. If at least one of the detected one or more other objects do not move within the predetermined period of time, the driving maneuver can further include proceeding through the multi-stop intersection (e.g., passing straight through the intersection, turning though the intersection, etc.).

When determining that the arrival time of the autonomous vehicle and the detected one or more other objects at the multi-stop intersection is substantially the same is based on predicted arrival times, the driving maneuver can include, in one example, stopping short of an originally intended stopping point in a current travel lane of the autonomous vehicle. The vehicle can be configured to stop a predetermined distance short of the originally intended stopping point. In one or more arrangements, the driving maneuver can include decelerating so that the arrival time of the autonomous vehicle is not substantially the same as the predicted arrival time of the detected one or more other objects at the multi-stop intersection. For example, the driving maneuver includes decelerating so that the arrival time of the autonomous vehicle is later than the predicted arrival time of the detected one or more other objects at the multi-stop intersection.

In one or more arrangements, one or more of the modules 120, 132, 133, 134 described herein can include artificial or computational intelligence elements, e.g., neural network, fuzzy logic or other machine learning algorithms. Further, in one or more arrangements, one or more of the modules 120, 132, 133, 134 can be distributed among a plurality of the modules described herein. In one or more arrangements, two or more of the modules 120, 132, 133, 134 described herein can be combined into a single module.

The vehicle 100 can include one or more vehicle systems 145. Various examples of the one or more vehicle systems 145 are shown in FIG. 1. However, the vehicle 100 can include more, fewer or different systems. It should be appreciated that although particular vehicle systems are separately defined, each or any of the systems or portions thereof may be otherwise combined or segregated via hardware and/or software within the vehicle 100. The vehicle 100 can include a propulsion system 150, a braking system 155, a steering system 160, throttle system 165, a transmission system 170, a signaling system 175, and/or a navigation system 180. Each of these systems will be described in turn below.

The propulsion system 150 can include one or more mechanisms, devices, elements, components, systems, and/or combinations thereof, now known or later developed, configured to provide powered motion for the vehicle 100. The braking system 155 can include one or more mechanisms, devices, elements, components, systems, and/or combinations thereof, now known or later developed, configured to decelerate the vehicle 100. The steering system 160 can include one or more mechanisms, devices, elements, components, systems, and/or combinations thereof, now known or later developed, configured to adjust the heading of the vehicle 100. The throttle system 165 can include one or more mechanisms, devices, elements, components, systems, and/or combinations thereof, now known or later developed, configured to control the operating speed of an engine/motor of the vehicle 100 and, in turn, the speed of the vehicle 100.

The transmission system 170 can include one or more mechanisms, devices, elements, components, systems, and/or combinations thereof, now known or later developed, configured to transmit mechanical power from the engine/motor of the vehicle 100 to wheels or tires of the vehicle 100. The signaling system 175 can include one or more mechanisms, devices, elements, components, systems, and/or combinations thereof, now known or later developed, configured to provide illumination for the driver of the vehicle 100 and/or to provide information with respect to one or more aspects of the vehicle 100.

The vehicle 100 can include a navigation system 180. The navigation system 180 can include one or more mechanisms, devices, elements, components, systems, applications and/or combinations thereof, now known or later developed, configured to determine the geographic location of the vehicle 100 and/or to determine a travel route for the vehicle 100.

The navigation system 180 can include one or more mapping applications to determine a travel route for the vehicle 100. For instance, a driver or passenger may input an origin and a destination. The mapping application can determine one or more suitable travel routes between the origin and the destination. A travel route may be selected based on one or more parameters (e.g. shortest travel distance, shortest amount of travel time, etc.). In some arrangements, the navigation system 180 can be configured to update the travel route dynamically while the vehicle 100 is in operation.

The navigation system 180 can include a global positioning system, a local positioning system or a geolocation system. The navigation system 180 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the navigation system 180 can use Transmission Control Protocol (TCP) and/or a Geographic information system (GIS) and location services.

The navigation system 180 may include a transceiver configured to estimate a position of the vehicle 100 with respect to the Earth. For example, navigation system 180 can include a GPS transceiver to determine the vehicle's latitude, longitude and/or altitude. The navigation system 180 can use other systems (e.g. laser-based localization systems, inertial-aided GPS, and/or camera-based localization) to determine the location of the vehicle 100.

Alternatively or in addition, the navigation system 180 can be based on access point geolocation services, such as using the W3C Geolocation Application Programming Interface (API). With such a system, the location of the vehicle 100 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the vehicle 100 is determined will depend on the manner of operation of the particular location tracking system used.

The processor 110 and/or the autonomous driving module 120 can be operatively connected to communicate with the various vehicle systems 145 and/or individual components thereof. For example, returning to FIG. 1, the processor 110 and/or the autonomous driving module 120 can be in communication to send and/or receive information from the various vehicle systems 145 to control the movement, speed, maneuvering, heading, direction, etc. of vehicle 100. The processor 110 and/or the autonomous driving module 120 may control some or all of these vehicle systems 145 and, thus, may be partially or fully autonomous.

The processor 110 and/or the autonomous driving module 120 may be operable to control the navigation and/or maneuvering of the vehicle 100 by controlling one or more of the vehicle systems 145 and/or components thereof. For instance, when operating in an autonomous mode, the processor 110 and/or the autonomous driving module 120 can control the direction and/or speed of the vehicle 100. The processor 110 and/or the autonomous driving module 120 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 140. The actuators 140 can be any element or combination of elements operable to modify, adjust and/or alter one or more of the vehicle systems 145 or components thereof to responsive to receiving signals or other inputs from the processor 110 and/or the autonomous driving module 120. Any suitable actuator can be used. For instance, the one or more actuators 140 can include motors, pneumatic actuators, hydraulic pistons, relays, solenoids, and/or piezoelectric actuators, just to name a few possibilities.

Figure 2:
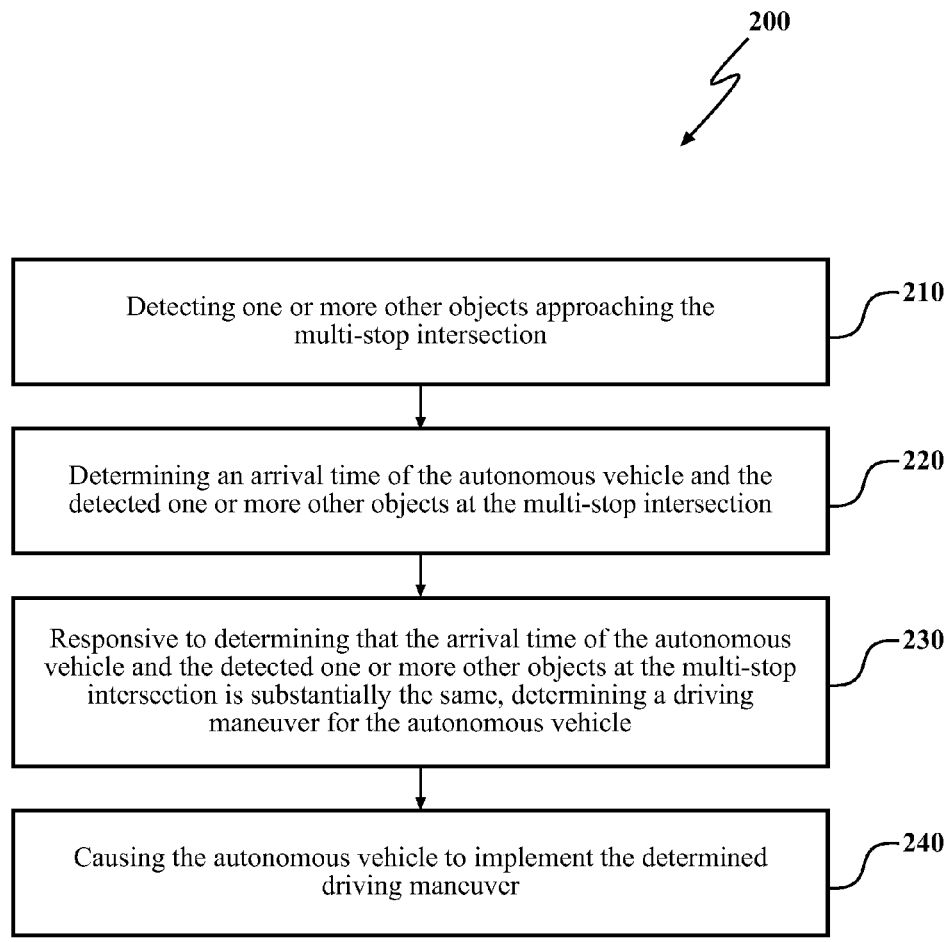
FIG. 2 is an example of a method for operating an autonomous vehicle relative to a multi-stop intersection.

Now that the various potential systems, devices, elements and/or components of the vehicle 100 have been described, various methods will now be described. Referring now to FIG. 2, an example of a method of operating an autonomous vehicle with respect to a multi-stop intersection is shown. Various possible steps of method 200 will now be described. The method 200 illustrated in FIG. 2 may be applicable to the arrangements described above in relation to FIG. 1, but it is understood that the method 200 can be carried out with other suitable systems and arrangements. Moreover, the method 200 may include other steps that are not shown here, and in fact, the method 200 is not limited to including every step shown in FIG. 2. The steps that are illustrated here as part of the method 200 are not limited to this particular chronological order. Indeed, some of the steps may be performed in a different order than what is shown and/or at least some of the steps shown can occur simultaneously.

At block 210, one or more other objects approaching the multi-stop intersection can be detected. The one or more other objects can be approaching the multi-stop intersection from a different direction than the autonomous vehicle. The detecting can be performed continuously, periodically at any suitable interval, irregularly, or even randomly. The detecting can be performed by any suitable element or combination of elements of the vehicle 100. In one or more arrangements, the detecting can be performed by the sensor system 125 or one or more sensors thereof (e.g., radar sensor(s) 127, lidar sensor(s) 128, and/or camera(s) 129). The method 200 can continue to block 220.

At block 220, an arrival time of the autonomous vehicle can be determined, and an arrival time for the detected one or more other objects at the multi-stop intersection can be determined. Such determinations can be performed by any suitable element or combination of elements of the vehicle 100. In one or more arrangements, the determining of the arrival time can be performed, at least in part, by the arrival time determination module 133 and/or the processor 110. The determination can be an actual arrival time or a predicted arrival time. Such determinations can be made using data acquired by the sensor system 125 (or component thereof). In one or more arrangements, the arrival time determination module 133 and/or the processor 110 can determine whether the arrival time of the autonomous vehicle and the arrival time of the detected one or more other objects is substantially the same. The method 200 can continue to block 230.

At block 230, responsive to determining that the arrival time of the autonomous vehicle and the detected one or more other objects at the multi-stop intersection is substantially the same, a driving maneuver for the autonomous vehicle can be determined. The determining whether the arrival time of the autonomous vehicle and the detected one or more other objects at the multi-stop intersection is substantially the same can be performed by any suitable element or combination of elements of the vehicle 100. In one or more arrangements, the determining can be performed, at least in part, by the multi-stop intersection behavior module 134, the autonomous driving module 120, and/or the processor 110. Any suitable driving maneuver can be determined. In one or more arrangements, the determination of the driving maneuver can be dependent upon the manner in which the arrival time is determined. The method 200 can continue to block 240.

At block 240, the autonomous vehicle can be caused to implement the determined driving maneuver. For instance, the multi-stop intersection behavior module 134, the autonomous driving module 120, and/or the processor 110 can control the navigation and/or maneuvering of the vehicle 100 by controlling one or more of the vehicle systems 145 and/or components thereof. Such controlling can be performed directly or indirectly (e.g., by controlling one or more actuators 140). In one or more arrangements, causing the autonomous vehicle to implement the determined driving maneuver can be performed responsive to receiving permission to implement the determined driving maneuver. In such case, a vehicle occupant can be prompted to provide permission to implement the determined driving maneuver. In one or more arrangements, causing the autonomous vehicle to implement the determined driving maneuver can be performed automatically.

The method 200 can end. Alternatively, the method 200 can return to block 210. As a further alternative, the method 200 can include additional blocks (not shown).

Figure 3A:
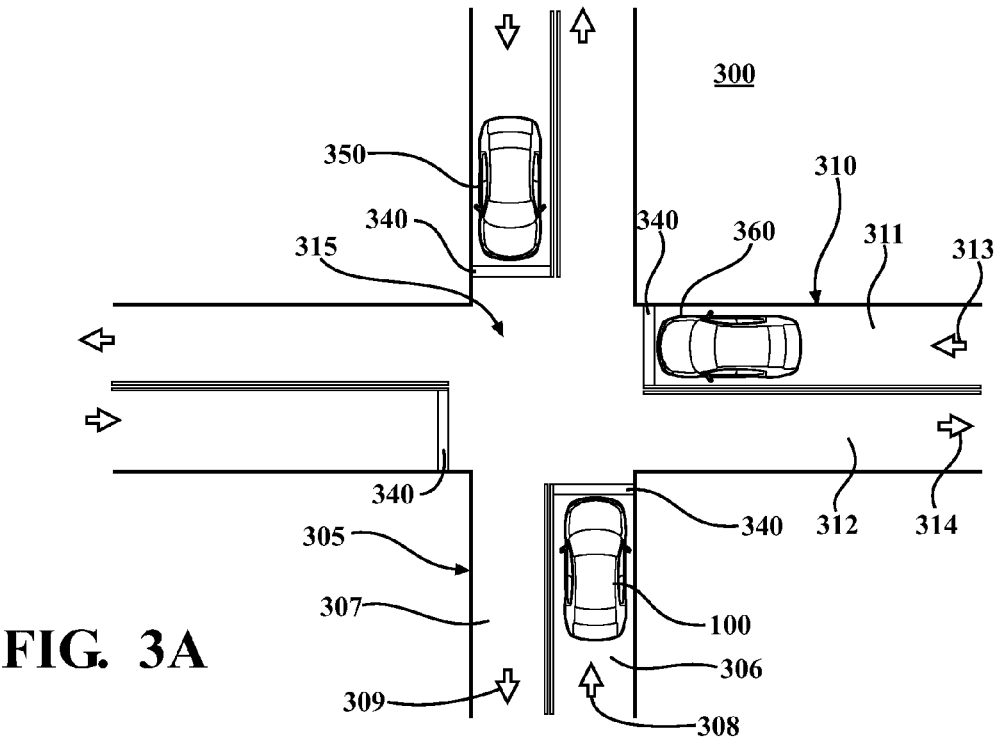
FIG. 3A is an example of a driving environment with a multi-stop intersection, showing a scenario in which the actual arrival time of the autonomous vehicle and the actual arrival time of one or more other vehicles at the multi-stop intersection is substantially the same.
Figure 3B:
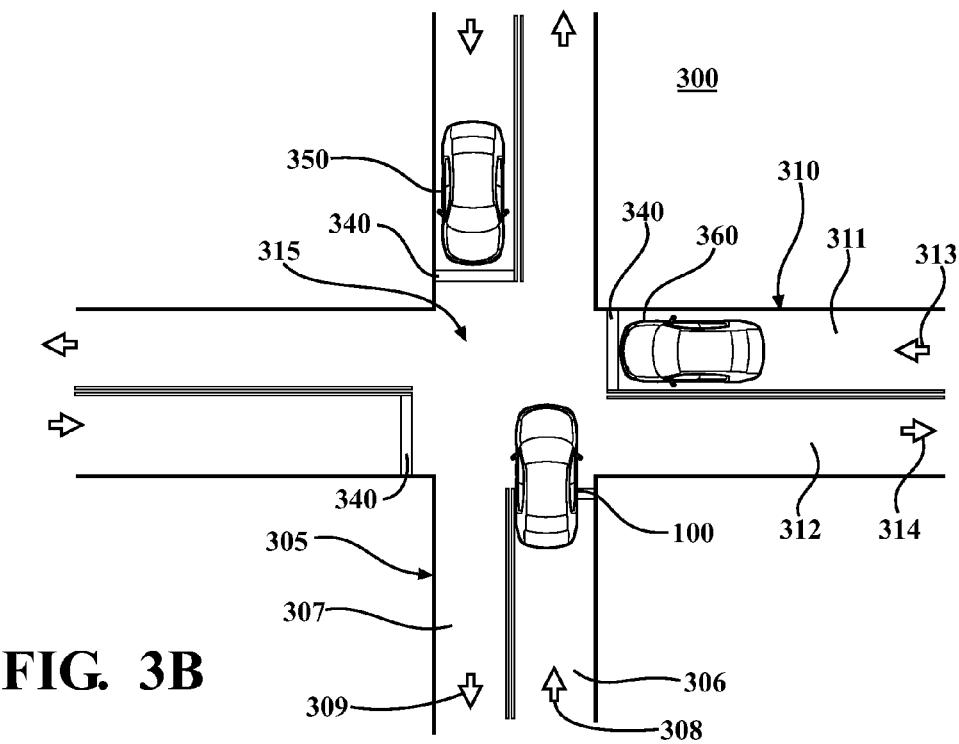
FIG. 3B is an example of the driving environment with the multi-stop intersection of FIG. 3A, showing a subsequent point in time in which the autonomous vehicle implements a driving maneuver if the one or more other vehicles have not moved after a predetermined period of time.

One non-limiting example of the operation of the vehicle 100 in accordance with the method 200 will now be described. FIGS. 3A and 3B show an example of a driving environment 300. For purposes of this example, the vehicle 100 can be traveling in an environment 300 that includes a first road 305 and a second road 310. As used herein, "road" means a thoroughfare, route, path or way between two places and upon which a vehicle can travel. A road may be paved or otherwise improved to facilitate travel by a vehicle thereon. In some instances, a road may be unpaved or undeveloped. A road may be a public road or a private road. A road can include or be a part of one or more bridges, tunnels, supporting structures, junctions, crossings, interchanges, and toll roads.

The first road 305 and the second road 310 can cross each other to form an intersection 315. In one or more arrangements, traffic with respect to the intersection 315 can be regulated using any suitable traffic control device (e.g. stop signs, traffic lights, road markers, etc.). The first road 305 and the second road 310 can be oriented at any suitable angle with respect to each other. For instance, the first road 305 and the second road 310 can be oriented at substantially 90 degrees relative to each other, as is shown in FIGS. 3A and 3B. However, in one or more arrangements, the first road 305 and the second road 310 can be oriented at an acute angle with respect to each other. In one or more arrangements, the first road 305 and the second road 310 can be angled at an obtuse angle with respect to each other. Further, in some arrangements, the intersection 315 can be formed by more than two roads. While FIGS. 3A and 3B shows the first and second roads 305, 310 as continuing beyond the intersection 315, it will be appreciated that arrangements are not limited to such a road configuration. Indeed, in some instances, one or more of the roads that approach the multi-stop intersection may terminate at the intersection. One example of such an occurrence is in a T-shaped intersection.

The first road 305 and the second road 310 can have any suitable configuration and/or layout. The first road 305 and/or the second road 310 can be designated for two way travel, including a plurality of travel lanes. A "travel lane" is a portion of a road that is designated for use by a single line of vehicles and/or a portion of a road that is being used by a single line of vehicles. In some instances, the one or more travel lanes can be designated by markings on the road or in any other suitable manner. In some instances, the one or more travel lanes may not be marked.

For purposes of this example, the first road 305 can include two travel lanes: a first travel lane 306 and a second travel lane 307. The first travel lane 306 can be intended or designated for vehicular travel in a first direction 308. The second travel lane 307 can be intended or designated for vehicular travel in a second direction 309. The first direction 308 can be substantially opposite to the second direction 309.

For purposes of this example, the second road 310 can include two travel lanes: a third travel lane 311 and a fourth travel lane 312. The third travel lane 311 can be intended or designated for vehicular travel in a third direction 313. The fourth travel lane 312 can be intended or designated for vehicular travel in a fourth direction 314. The third direction 313 can be substantially opposite to the fourth direction 314.

It will be understood that arrangements shown and described herein with respect to the first road 305, the second road 310 and/or the intersection 315 are provided merely as examples, and arrangements are not limited to the particular arrangements shown and described. Indeed, arrangements described herein can be used in connection with roads having any quantity, type and/or arrangement of travel lanes.

Referring to FIG. 3A, the vehicle 100 can be traveling on the first road 305. The current travel path of the vehicle 100 can include passing through the intersection 315 on the first road 305. The vehicle 100 can be approaching the intersection 315 in the first travel lane 306 while traveling in the first direction 308. As the vehicle 100 approaches the intersection 315, the vehicle 100 can be presented with an indication to stop, such as by a traffic control device.

A first other vehicle 350 can be traveling on the first road 305. The current travel lane of the first other vehicle 350 can be the second travel lane 307. The first other vehicle 350 can be approaching the intersection 315 traveling in the second direction 309. For purposes of this example, the first other vehicle 350 and the second other vehicle 360 can be non-autonomous vehicles. However, it will be understood that arrangements described herein can be implemented when the first other vehicle 350 and/or the second other vehicle 360 are autonomous vehicles.

A second other vehicle 360 can be traveling on the second road 310. The current travel lane of the second other vehicle 360 can be the third travel lane 311. The second other vehicle 360 can be approaching the intersection 315 traveling in the third direction 313. The vehicle 100, the first other vehicle 350, and the second other vehicle 360 can come to a stop at the intersection 315 at substantially the same time. The vehicle 100, the first other vehicle 350, and the second other vehicle 360 can come to a stop at or near a respective stop indicator (e.g., the stop line 340).

As the vehicle 100 approaches the intersection 325, the vehicle 100 can detect the environment 300, such as by using one or more sensors of the sensor system 125. The vehicle 100 can detect the presence of other objects in the environment 300 that are approaching the intersection from a different direction that the vehicle 100. Thus, in this example, the vehicle 100 can detect the first other vehicle 350 and the second other vehicle 360, and their associated movement. The vehicle 100 can also detect the stop indicators in the various travel lanes 306, 307, 311.

The vehicle 100 can determine its own arrival time at the intersection 315. Further, the vehicle 100 can determine the arrival time of the first other vehicle 350 and the second other vehicle 360 detected in the environment 300. In this example, the vehicle 100 can determine the actual arrival time for each of the vehicles 100, 350, 360. The actual arrival time can be based on when each vehicle 100, 350, 360 comes to a substantially complete stop. In this example, the vehicle 100 can arrive at the intersection 315 before the first and second other vehicles 350, 360. The arrival time of the first other vehicle 350 can be about 150 millisecond later than the arrival time of the vehicle 100. The arrival time of the second other vehicle 360 can be about 500 milliseconds subsequent to the arrival time of the vehicle 100. The arrival time of the vehicle 100 and the other vehicles 350, 360 can be determined by, for example, the arrival time determination module 133 and/or the processor 110.

The vehicle 100 can determine whether the arrival times are substantially the same. For instance, if the arrival times are within a predetermined amount of time from each other (e.g., about 1 second or less), then the vehicle 100 can determine that the arrival times are substantially the same. Such a determination can be made by, for example, the arrival time determination module 133 and/or the processor 110.

In response to determining that the arrival time of the autonomous vehicle and the first and second other vehicles 350, 360 are substantially the same, a driving maneuver for the vehicle 100 can be determined. Any suitable driving maneuver can be determined. The driving maneuver can be determined so as to minimize confusion with the other vehicles 350, 360 in determining which vehicle should proceed through the intersection 315 first. The driving maneuver can be determined by the multi-stop intersection behavior module 134, the autonomous driving module 120, and/or the processor 110.

The vehicle 100 can be caused (e.g. by the processor 110, the autonomous driving module 120, the multi-stop intersection behavior module 134, and/or the actuators 140) to implement the determined driving maneuver. For purposes of this example, the driving maneuver can include remaining stopped at the multi-stop intersection for a predetermined period of time, as is shown in FIG. 3A. Such a driving maneuver can be determined even if, as here, the vehicle 100 was actually the first one of the vehicles 100, 350, 360 to stop at the intersection. The vehicle 100 can remain stopped at the intersection 315 for a predetermined period of time. In one example, the predetermined period of time can be about 5 seconds or less, about 4 seconds or less, or about 3 seconds or less. However, it will be understood that these are merely examples, as the predetermined period of time can be greater than or less than these examples. If the first other vehicle 350 or the second other vehicle 360 do not proceed through the intersection or otherwise move forward within the predetermined period of time, then the vehicle 100 can proceed through the intersection 315 in the intended manner (e.g., continuing straight on the first road 305, turning onto the second road 310, etc.). An example of the vehicle 100 implementing such a driving maneuver is shown in FIG. 3B.

Figure 4:
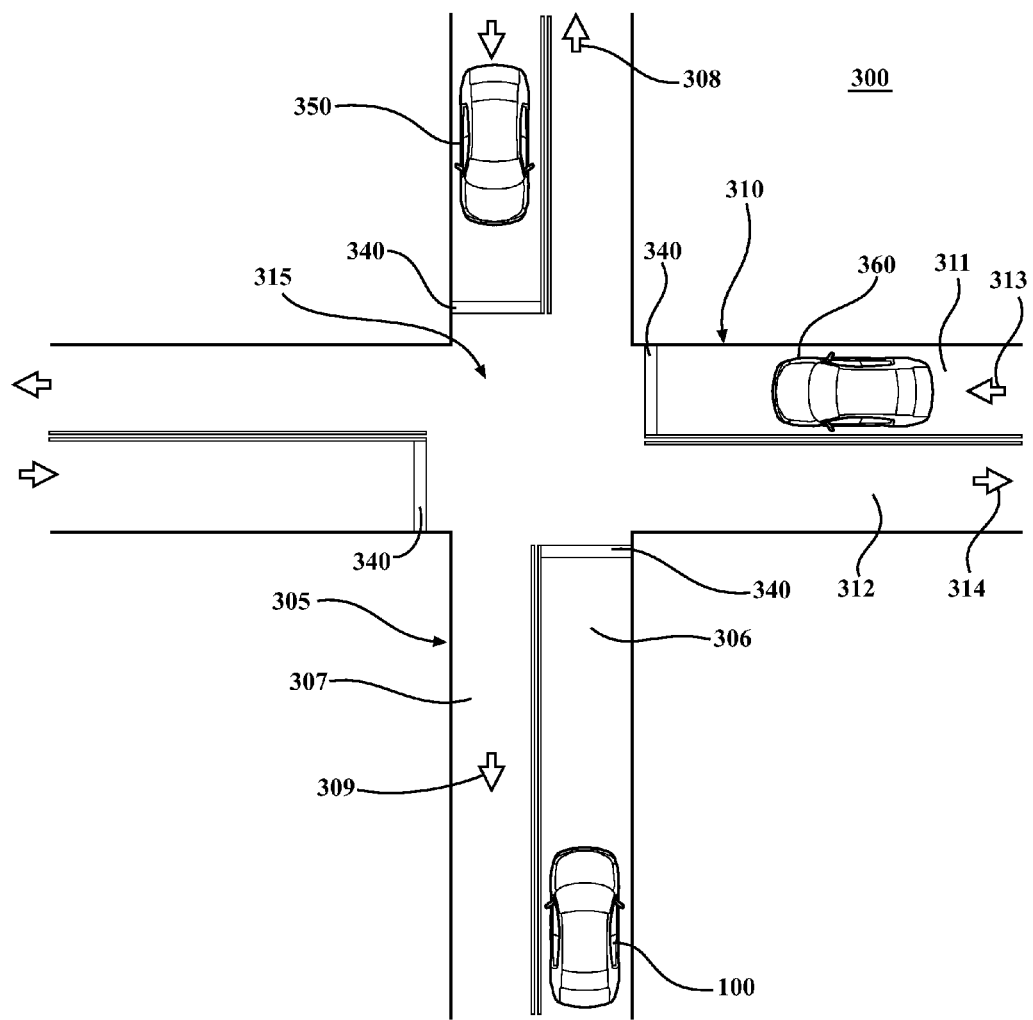
FIG. 4A is an example of a driving environment with a multi-stop intersection, showing a scenario in which the arrival time of the autonomous vehicle and the arrival time of one or more other vehicles at the multi-stop intersection is predicted to be substantially the same.
FIG. 4B is an example of the driving environment with the multi-stop intersection of FIG. 4A, showing a subsequent point in time in which the autonomous vehicle implements a driving maneuver prior to arriving at the intersection.
Figure 4B:
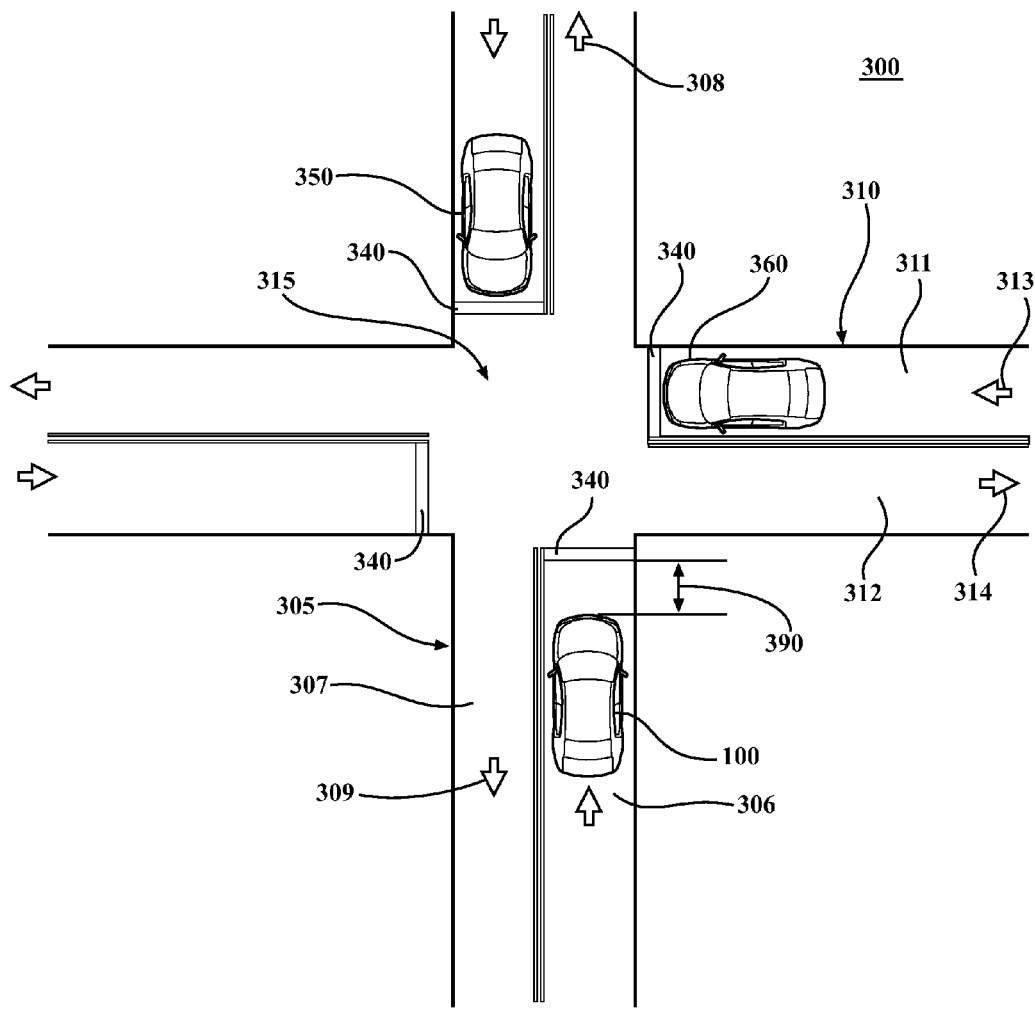

Another non-limiting example of the operation of the vehicle 100 in accordance with the method 200 will now be described in relation to FIGS. 4A and 4B. For purposes of this example, a similar environment to the environment 300 depicted in FIGS. 3A and 3B is presented. Accordingly, the above discussion of the first road 305, the second road 310, and the intersection 315 is equally applicable with respect to FIGS. 4A and 4B. Also, the above discussion with respect to the directions from which the vehicle 100, the first other vehicle 350, and the second other vehicle 360 are approaching the intersection is equally applicable with respect to FIGS. 4A and 4B.

As the vehicle 100 approaches the intersection 325, the vehicle 100 can detect the environment 300, such as by using one or more sensors of the sensor system 125. The vehicle 100 can detect the presence of other objects in the environment 300 that are approaching the intersection from a different direction that the vehicle 100. Thus, in this example, the vehicle 100 can detect the first other vehicle 350 and the second other vehicle 360, their associated speeds, their associated rate of deceleration, and/or their associated distance from a stopping point (e.g., stop lines 340) before the intersection 315.

The vehicle 100 can determine its own arrival time at the intersection 315. Further, the vehicle 100 can determine the arrival time of the first other vehicle 350 and the second other vehicle 360 detected in the environment 300. In this example, the vehicle 100 can predict the arrival time for each of the vehicles 100, 350, 360. The predicted arrival time can be based on one or more factors. For instance, with respect to the vehicle 100, the prediction can be at least partially based on one or more of the following factors: a current speed of the vehicle 100, a current rate of deceleration of the vehicle 100, a current rate of change of the speed of the vehicle 100, and/or the distance between the vehicle 100 and a designated stopping point relative to the intersection 315. The one or more of these factors can be used to predict the arrival time of the first and second other vehicles 350, 360. The arrival time of the vehicle 100 and the other vehicles 350, 360 can be determined by, for example, the arrival time determination module 133 and/or the processor 110.

The vehicle 100 can determine whether the arrival times are substantially the same. For instance, if the arrival times are within a predetermined amount of time from each other (e.g., about 2 second or less, about 1 second or less, etc.), then the vehicle 100 can determine that the arrival times are substantially the same. Such a determination can be made by, for example, the arrival time determination module 133 and/or the processor 110.

In response to determining that the arrival time of the autonomous vehicle and the first and second other vehicles 350, 360 are substantially the same, a driving maneuver for the vehicle 100 can be determined. Any suitable driving maneuver can be determined. The driving maneuver can be determined so as to minimize confusion with the other vehicles 350, 360 in determining which vehicle should proceed through the intersection 315 first. The driving maneuver can be determined by the multi-stop intersection behavior module 134, the autonomous driving module 120, and/or the processor 110.

The vehicle 100 can be caused (e.g. by the processor 110, the autonomous driving module 120, the multi-stop intersection behavior module 134, and/or the actuators 140) to implement the determined driving maneuver. For purposes of this example, the driving maneuver can include stopping short of an intended stopping point in the current travel lane (e.g., the first travel lane 306). For instance, the driving maneuver can include stopping short of a stop line 340 by a predetermined distance 390. An example of the vehicle 100 implementing such a driving maneuver is shown in FIG. 4B. The predetermined distance 390 can have any suitable value (e.g., about 5 meters or less, about 4 meters or less, about 3 meters or less, about 2 meters or less, about 1 meter or less). In this way, the vehicle 100 can signal to the first and second other vehicles 350, 360 that it intends to allow them to proceed through the intersection 315 first. Once the other vehicles 350, 360 pass through the intersection, the vehicle 100 can proceed through the intersection.

It will be appreciated that stopping short of an intended stopping point is merely one example of a suitable driving maneuver. Indeed, it will be understood that arrangements are not limited to this driving maneuver. Other suitable driving maneuvers are possible. For example, the driving maneuver can include the vehicle 100 decelerating or changing its rate of deceleration so that the arrival time of the vehicle 100 is not substantially the same as the predicted arrival time of the detected other vehicles 350, 360. For instance, the driving maneuver includes the vehicle 100 decelerating or changing its rate of deceleration so that the arrival time of the vehicle 100 is later than the predicted arrival time of the detected other vehicles 350, 360 at the intersection 315.

It will be appreciated that arrangements described herein can provide numerous benefits, including one or more of the benefits mentioned herein. For example, arrangements described herein can improve the performance of an autonomous vehicle. Arrangements described herein can facilitate the safe operation of an autonomous vehicle. For instance, arrangements described herein can avoid near crash situations between an autonomous vehicle and other vehicles at multi-stop intersections, particularly when the drivers of the other vehicles misjudge that their vehicles have stopped first at the intersection. Arrangements described herein can help to avoid confusing traffic scenes, such as a four way stop in which some negotiation between the drivers may be needed. Arrangements described herein can adjust vehicle behavior to inform other drivers of the intention of the vehicle, both with/without additional sensing. For instance, arrangements described herein can achieve consensus with other drivers by the autonomous vehicle showing its intention to yield to the other vehicles. Arrangements described herein can minimize the gap between human behavior and autonomous vehicle behavior at multi-stop intersections. Arrangements described herein can enhance the reputation of autonomous vehicle technology, in general and/or with respect to a particular automaker, to realize safe real-world traffic scenes which may contain both automated vehicles and non-autonomous vehicles.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of operating an autonomous vehicle with respect to other vehicles at a multi-stop intersection, the method comprising:
    detecting one or more other objects approaching the multi-stop intersection from a different direction than the autonomous vehicle;
    determining an arrival time of the autonomous vehicle and the detected one or more other objects at the multi-stop intersection;
    responsive to determining that the arrival time of the autonomous vehicle and the detected one or more other objects at the multi-stop intersection is substantially the same, determining a driving maneuver for the autonomous vehicle, the driving maneuver including stopping short of an originally intended stopping point in a current travel lane of the autonomous vehicle such that the detected one or more other objects arrive at the multi-stop intersection before the autonomous vehicle; and
    causing the autonomous vehicle to implement the determined driving maneuver, whereby the autonomous vehicles indicates its intention to allow the one or more other objects to proceed through the multi-stop intersection before the autonomous vehicle.

2. The method of claim 1, wherein determining the arrival time of the autonomous vehicle and the detected one or more other objects at the multi-stop intersection includes predicting the arrival time of the autonomous vehicle and at least one of the detected one or more other objects at the multi-stop intersection.

3. The method of claim 1, wherein causing the autonomous vehicle to implement the determined driving maneuver is performed automatically.

4. A method of operating an autonomous vehicle with respect to other vehicles at a multi-stop intersection, the method comprising:
    detecting one or more other objects approaching the multi-stop intersection from a different direction than the autonomous vehicle;
    determining an arrival time of the autonomous vehicle and the detected one or more other objects at the multi-stop intersection;
    responsive to determining that the arrival time of the autonomous vehicle and the detected one or more other objects at the multi-stop intersection is substantially the same, determining a driving maneuver for the autonomous vehicle, the driving maneuver including decelerating so that the arrival time of the autonomous vehicle is later than the determined arrival time of the detected one or more other objects at the multi-stop intersection; and
    causing the autonomous vehicle to implement the determined driving maneuver, whereby the autonomous vehicles indicates its intention to allow the one or more other objects to proceed through the multi-stop intersection before the autonomous vehicle.

5. The method of claim 4, wherein the driving maneuver includes decelerating so that the arrival time of the autonomous vehicle is later than the determined arrival time of the detected one or more other objects at the multi-stop intersection.

6. A method of operating an autonomous vehicle with respect to other vehicles at a multi-stop intersection, the method comprising:

detecting one or more other objects approaching the multi-stop intersection from a different direction than the autonomous vehicle;

determining an arrival time of the autonomous vehicle and the detected one or more other objects at the multi-stop intersection;

responsive to determining that the arrival time of the autonomous vehicle and the detected one or more other objects at the multi-stop intersection is substantially the same, determining a driving maneuver for the autonomous vehicle, the driving maneuver including remaining stopped at the multi-stop intersection for a predetermined period of time; and causing the autonomous vehicle to implement the determined driving maneuver, whereby the autonomous vehicles indicates its intention to allow the one or more other objects to proceed through the multi-stop intersection before the autonomous vehicle.

7. The method of claim 6, wherein, if at least one of the detected one or more other objects does not move within the predetermined period of time, the driving maneuver further includes proceeding through the multi-stop intersection.

8. A system for an autonomous vehicle a multi-stop intersection comprising:

a sensor system configured to detect one or more other objects approaching the multi-stop intersection from a different direction than the autonomous vehicle; and a processor operatively connected to the sensor system, the processor being programmed to initiate executable operations comprising:

determining an arrival time of the autonomous vehicle and the detected one or more other objects at the multi-stop intersection;

responsive to determining that the arrival time of the autonomous vehicle and the detected one or more other objects at the multi-stop intersection is substantially the same, determining a driving maneuver for the autonomous vehicle, the driving maneuver including stopping short of an originally intended stopping point in a current travel lane of the autonomous vehicle such that the detected one or more other objects arrive at the multi-stop intersection before the autonomous vehicle; and causing the autonomous vehicle to implement the determined driving maneuver whereby the autonomous vehicles indicates its intention to allow the one or more other objects to proceed through the multi-stop intersection before the autonomous vehicle.

9. The system of claim 8, wherein determining the arrival time of the autonomous vehicle and the detected one or more other objects at the multi-stop intersection includes predicting the arrival time of the autonomous vehicle and at least one of the detected one or more other objects at the multi-stop intersection.

10. A system for an autonomous vehicle a multi-stop intersection comprising:

a sensor system configured to detect one or more other objects approaching the multi-stop intersection from a different direction than the autonomous vehicle; and a processor operatively connected to the sensor system, the processor being programmed to initiate executable operations comprising:

determining an arrival time of the autonomous vehicle and the detected one or more other objects at the multi-stop intersection;

responsive to determining that the arrival time of the autonomous vehicle and the detected one or more other objects at the multi-stop intersection is substantially the same, determining a driving maneuver for the autonomous vehicle, the driving maneuver including decelerating so that the arrival time of the autonomous vehicle is later than the determined arrival time of the detected one or more other objects at the multi-stop intersection; and causing the autonomous vehicle to implement the determined driving maneuver whereby the autonomous vehicles indicates its intention to allow the one or more other objects to proceed through the multi-stop intersection before the autonomous vehicle.

11. The system of claim 10, wherein the driving maneuver includes decelerating so that the arrival time of the autonomous vehicle is later than the determined arrival time of the detected one or more other objects at the multi-stop intersection.

12. A system for an autonomous vehicle a multi-stop intersection comprising:

a sensor system configured to detect one or more other objects approaching the multi-stop intersection from a different direction than the autonomous vehicle; and a processor operatively connected to the sensor system, the processor being programmed to initiate executable operations comprising:

determining an arrival time of the autonomous vehicle and the detected one or more other objects at the multi-stop intersection;

responsive to determining that the arrival time of the autonomous vehicle and the detected one or more other objects at the multi-stop intersection is substantially the same, determining a driving maneuver for the autonomous vehicle, the driving maneuver including remaining stopped at the multi-stop intersection for a predetermined period of time; and causing the autonomous vehicle to implement the determined driving maneuver, whereby the autonomous vehicles indicates its intention to allow the one or more other objects to proceed through the multi-stop intersection before the autonomous vehicle.

13. The system of claim 12, wherein, if at least one of the detected one or more other objects does not move within the predetermined period of time, the driving maneuver further includes proceeding through the multi-stop intersection.

14. A computer program product for operating an autonomous vehicle with respect to other vehicles at a multi-stop intersection, the computer program product comprising a non-transitory computer readable storage medium having program code embodied therein, the program code executable by a processor to perform a method comprising:

determining an arrival time of the autonomous vehicle and a detected one or more other objects at the multi-stop intersection, the detected one or more other objects approaching the multi-stop intersection from a different direction than the autonomous vehicle;

responsive to determining that the arrival time of the autonomous vehicle and the detected one or more other objects at the multi-stop intersection is substantially the same, determining a driving maneuver for the autonomous vehicle, the driving maneuver including one of:

stopping short of an originally intended stopping point in a current travel lane of the autonomous vehicle such that the detected one or more other objects arrive at the multi-stop intersection before the autonomous vehicle, or decelerating so that the arrival time of the autonomous vehicle is later than the determined arrival time of the detected one or more other objects at the multi-stop intersection; and causing the autonomous vehicle to implement the determined driving maneuver, whereby the autonomous vehicles indicates its intention to allow the detected one or more other objects to proceed through the multi-stop intersection before the autonomous vehicle.

15. The computer program product of claim 14, wherein determining the arrival time of the autonomous vehicle and the detected one or more other objects at the multi-stop intersection includes predicting the arrival time of the autonomous vehicle and at least one of the detected one or more other objects at the multi-stop intersection.

16. The method of claim 6, wherein determining the arrival time of the autonomous vehicle and the detected one or more other objects at the multi-stop intersection includes determining the actual arrival time of the autonomous vehicle and the detected one or more other objects at the multi-stop intersection.

17. The system of claim 12, wherein determining the arrival time of the autonomous vehicle and the detected one or more other objects at the multi-stop intersection includes determining the actual arrival time of the autonomous vehicle and the detected one or more other objects at the multi-stop intersection.

* * * * *